(12) United States Patent
Eguchi

(10) Patent No.: US 6,320,336 B1
(45) Date of Patent: Nov. 20, 2001

(54) BICYCLE WITH POWER ASSISTING FUNCTION

(75) Inventor: Yasuhito Eguchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/408,949

(22) Filed: Sep. 30, 1999

(30) Foreign Application Priority Data

Oct. 12, 1998 (JP) .................................................. 10-289274

(51) Int. Cl.[7] ........................................................ H02P 3/00
(52) U.S. Cl. .............................. 318/139; 318/12; 318/14; 318/489; 180/220; 180/205; 180/65.1; 180/65.6
(58) Field of Search ..................................... 318/432–434, 318/139, 9–15, 446–7, 461, 489; 180/65.1, 65.2, 65–6, 65.8, 205–207, 220

(56) References Cited

U.S. PATENT DOCUMENTS

| | | | |
|---|---|---|---|
| 4,637,274 | * | 1/1987 | Goldenfeld ............................ 74/625 |
| 5,512,022 | * | 4/1996 | Suzuki .................................... 475/2 |
| 5,644,511 | * | 7/1997 | McWhorter ............................ 474/69 |
| 5,799,747 | * | 9/1998 | Olsen ................................... 180/221 |
| 5,825,665 | * | 10/1998 | Swift et al. ............................ 33/366 |

FOREIGN PATENT DOCUMENTS

| | | |
|---|---|---|
| 798204 | 10/1997 | (EP) . |
| 10-119874 | 5/1998 | (JP) . |
| 8-262494 | 11/1996 | (JP) ................................ G02F/1/136 |

* cited by examiner

*Primary Examiner*—David S. Martin
(74) *Attorney, Agent, or Firm*—Ronald P. Kananen

(57) ABSTRACT

A bicycle with a power assisting function has an electric motor for adding part of propulsive forces to manual forces to assist in the manual forces, a battery for supplying electric energy to the electric motor, a treading force detecting circuit for detecting manual forces applied as propulsive forces, and a control circuit for controlling operation of the electric motor depending on the magnitude of detected manual forces. The electric motor is operable as an electric generator with extra manual forces for utilizing part of regenerated electric energy to charge the battery.

8 Claims, 17 Drawing Sheets

FIG. 5

TRAVELED DISTANCE: 1 Km

| SPEED | DOWNHIL 2 DEGREES AMOUNT OF CURRENT | DOWNHIL 4 DEGREES AMOUNT OF CURRENT | DOWNHIL 6 DEGREES AMOUNT OF CURRENT |
|---|---|---|---|
| Km/h | Ah | Ah | Ah |
| 4.00 | -0.051 | | |
| 6.00 | -0.103 | | |
| 8.00 | -0.125 | -0.077 | |
| 10.00 | -0.133 | -0.156 | |
| 12.00 | -0.133 | -0.205 | -0.108 |
| 14.00 | -0.128 | -0.236 | -0.198 |
| 16.00 | -0.119 | -0.254 | -0.262 |
| 18.00 | -0.106 | -0.263 | -0.308 |
| 20.00 | -0.089 | -0.265 | -0.340 |
| 22.00 | -0.069 | -0.261 | -0.361 |
| 24.00 | -0.045 | -0.252 | -0.373 |

FIG. 6

| TRAVELED DISTANCE: 1 Km | FLAT 0 DEGREE | UPHILL 2 DEGREES | UPHILL 4 DEGREES | UPHILL 6 DEGREES |
|---|---|---|---|---|
| SPEED | ASSISTED | ASSISTED | ASSISTED | ASSISTED |
| Km/h | Ah | Ah | Ah | Ah |
| 4.00 | 0.033 | 0.258 | 0.609 | 1.085 |
| 6.00 | 0.037 | 0.233 | 0.514 | 0.878 |
| 8.00 | 0.042 | 0.224 | 0.470 | 0.779 |
| 10.00 | 0.048 | 0.223 | 0.448 | 0.724 |
| 12.00 | 0.056 | 0.226 | 0.438 | 0.691 |
| 14.00 | 0.064 | 0.231 | 0.434 | 0.672 |
| 16.00 | 0.074 | 0.239 | 0.435 | 0.662 |
| 18.00 | 0.085 | 0.249 | 0.440 | 0.659 |
| 20.00 | 0.098 | 0.260 | 0.447 | — |
| 22.00 | 0.111 | 0.273 | — | — |
| 24.00 | 0.126 | — | — | — |

FIG. 11

| GRADIENT | TOTAL RESISTANCE 0.4Ω | TOTAL RESISTANCE 0.3Ω | TOTAL RESISTANCE 0.2Ω | TOTAL RESISTANCE 0.1Ω |
|---|---|---|---|---|
| ±6 | 49Km | 85Km | 330Km | ∞ |
| ±4 | 83Km | 122Km | 233Km | 2500Km |
| ±2 | 164Km | 220Km | 335Km | 695Km |
| ±0 (FLAT) | 79Km | 80Km | 81Km | 82Km |

FIG. 12A

TOTAL RESISTANCE: 0.6Ω

| GRADIENT | TIRE: 18 INCHES | TIRE: 16 INCHES | TIRE: 14 INCHES | TIRE: 12 INCHES |
|---|---|---|---|---|
| ±6 | 94Km | 169Km | 645Km | ∞ |
| ±4 | 128Km | 195Km | 383Km | 1823Km |
| ±2 | 103Km | 118Km | 135Km | 150Km |
| ±0(FLAT) | 68Km | 70Km | 71Km | 72Km |

FIG. 12B

TOTAL RESISTANCE: 0.52Ω

| GRADIENT | TIRE: 18 INCHES | TIRE: 16 INCHES | TIRE: 14 INCHES | TIRE: 12 INCHES |
|---|---|---|---|---|
| ±6 | 136Km | 270Km | ∞ | ∞ |
| ±4 | 163Km | 270Km | 633Km | ∞ |
| ±2 | 110Km | 123Km | 130Km | 157Km |
| ±0(FLAT) | 68Km | 70Km | 71Km | 72Km |

BICYCLE WITH POWER ASSISTING FUNCTION

BACKGROUND OF THE INVENTION

The present invention relates to a bicycle with a power assisting function, and more particularly to a bicycle with a power assisting function which has a power assisting device comprising an electric motor and is capable of applying part of its energy from extra manual power to charge a power supply of the electric motor for thereby increasing the distance that the bicycle can travel by being assisted by the power assisting device.

There have been proposed vehicles such as bicycles with a power assisting device for assisting in part of the propulsive power with auxiliary power from an electric motor or the like.

For example, a bicycle assisted by an electric motor increases its traction forces when assisted by the electric motor depending on the treading forces applied by the user to the pedals of the bicycle.

Since the rotational output of the electric motor may be transmitted only in a direction to accelerate the bicycle, the rotation of the electric motor is transmitted to the drive wheel via a one-way clutch (freewheel). The one-way clutch is effective to prevent the electric motor from becoming a useless load when the bicycle is run by only manual forces.

The distance that the power-assisted bicycle can travel for a charged quantity of electric energy in a battery on the bicycle is determined by the capacity of the battery and an electric current consumed by the electric motor to assist in running the bicycle.

A example with the following specifications will be described below:

Battery capacity: 5 Ah

Distance traveled by a single battery charging cycle: 30 km

If the bicycle runs 10 km everyday, then the battery on the bicycle has to be charged every 3 days. When the bicycle has run more than 30 km, the bicycle can no longer be assisted by the electric motor. The distance that the bicycle can travel per battery charging cycle is reduced when the bicycle runs uphill and downhill.

As described above, the conventional bicycle with the power assisting function based on the assistive power from the electric motor is disadvantageous in that it cannot travel a sufficient distance per battery charging cycle, needs frequent charging on the battery, and cannot be power-assisted after it has run beyond a certain distance.

FIG. 16 is a block diagram showing a basic arrangement of a conventional bicycle with a power assisting function, and FIG. 17 is a view showing the concept of power transmission of the conventional bicycle. In FIGS. 16 and 17, the bicycle has a crank 1, one-way clutches 2, 6, 10, a treading force detecting circuit 3, an electric motor 4, a speed reducer 5, a crank gear 7, a chain 8, a drive gear 9, a drive wheel 11, a motor drive/output control circuit 12, and a battery 13.

Manual forces applied to the crank 1 are detected by the treading force detecting circuit 3. The motor drive/output control circuit 12 determines an assistive power from the treading forces and the bicycle speed, and controls a current and a voltage of the electric motor 4. If necessary, the motor drive/output control circuit 12 confirms that the voltage and the current are properly controlled. The assistive power is such that it produces the same traction forces as the treading forces up to a bicycle speed of 15 km/h, reduces the traction forces depending on the bicycle speed when the bicycle speed exceeds 15 km/h, and eliminates the traction forces when the bicycle speed is 24 km/h.

The treading forces on the crank 1 are transmitted via the one-way clutch 2 and the treading force detecting circuit 3 to the crank gear 7, and then via the chain 8 to the drive gear 9, from which they are transmitted via the one-way clutch 10 to drive the drive wheel 11, whereupon the bicycle runs in the direction of travel indicated by the arrow in FIG. 17. The output power of the electric motor 4 is transmitted via the speed reducer 5 and the one-way clutch 6 to the crank gear 7, from which it is transmitted in the same manner as with the treading forces from the crank 1. The manual forces and the assistive power from the electric motor are added and applied to the crank gear 7.

The one-way clutch 6 serves to prevent the rotation of the crank 1 from being transmitted to the electric motor 4, so that the manual forces are prevented from being lost when no assistive power is available.

The one-way clutch 2 serves to prevent the rotation of the electric motor 4 from being transmitted to the crank 1, so that the crank 1 is prevented from rotating against the intention of the rider.

In this system, since the electric motor 4 assists in rotating the crank 1 with the intention of the rider, the crank 1 does not rotate against the intention of the rider in principle. However, due to a delay in the detection of the treading forces, the inertia of the rotation of the electric motor, and other processing reasons, the crank 1 may receive rotational power from the electric motor 4. The one-way clutch 2 is required if such rotational power from the electric motor 4 to the crank 1 is not preferable.

The one-way clutch 10 serves to prevent the crank 1 from rotating due to momentum while the bicycle is running. If the one-way clutch 2 is present, then the crank 1 is prevented from rotating without the one-way clutch 10. The one-way clutch 10 is required if a loss caused by the rotation of the chain and the crank gear is not preferable.

The speed reducer 5 comprises a belt or a chain in FIG. 17.

Heretofore, as described above, the one-way clutch 10 is disposed to prevent the drive wheel 11 from rotating the electric motor 4 while the bicycle is running. When the bicycle is propelled, the drive wheel 11 is rotated by the electric motor 4 via the speed reducer. When the bicycle runs due to momentum or in a regenerative mode, the electric motor 4 is rotated by the drive wheel 11 via the speed reducer, amplifying an idling torque of the electric motor 4 and increasing a loss when the bicycle runs without propulsive power. The one-way clutch 10 is provided to avoid such a condition. (If the bicycle were viewed as an ordinary bicycle, it would become heavy when run by only manual forces or it would suffer increased resistance when pushed by the rider while walking.)

If the idling torque of the electric motor is 1 [kg-cm] and the speed reducer has a speed reduction ratio of 1:20, then the torque is amplified to 20 [kg-cm] as viewed from the drive wheel, making the rider feel a very large resistance from the bicycle. The torque of 20 [kg-cm] as converted to traction forces of the drive wheel is equal to about 6 [N]. This makes the rider feel a considerable increase in the resistance because the traction forces required for the bicycle to run at 15 km/h are about 10 [N].

The loss caused by the electric motor comprises a hysteresis loss of iron, a bearing loss, a windage loss, a brush friction loss, etc., with the hysteresis loss and the brush friction loss particularly become a problem.

As described above, the conventional bicycle with the power assisting function has problems in that it cannot travel a sufficient distance per battery charging cycle, needs frequent charging on the battery, and cannot be power-assisted after it has run beyond a certain distance.

SUMMARY OF THE INVENTION

It is therefore an object of the present invention to provide a bicycle with a power assisting function which utilizes part of the energy produced when the bicycle runs downhill or extra manual forces are available from the rider, in a regenerative mode for thereby increasing the distance that the bicycle can travel when it is power-assisted.

To accomplish the above object, there is provided a bicycle with a power assisting function, comprising an electric motor for adding part of propulsive forces to manual forces to assist in the manual forces, power supply means including a battery for supplying electric energy to the electric motor, control means for controlling operation of the electric motor, regenerating means for regenerating electric energy to charge the power supply with part of energy from extra manual forces, running state detecting means for detecting a running state, and display/indication means for displaying/indicating a running state and/or a running target depending on the running state detected by the running state detecting means. The display/indication means is capable of displaying/indicating an appropriate running speed to the rider of the bicycle for greatly increasing the distance that the bicycle can travel.

The running target may comprise propulsive forces to be generated manually, the display/indication means comprising means for displaying/indicating any difference between the running target and a present running state for the rider of the bicycle to determine the difference exactly. The display/indication means can display running instructions so as to be easily seen by the rider of the bicycle.

The running state detecting means may comprise gradient detecting means for detecting a gradient of a running path for the bicycle, and speed detecting means for detecting a present speed of the bicycle, the display/indication means comprising means for displaying/indicating a target speed and a present running speed detected by the speed detecting means and/or a quantity depending on an excess or insufficiency of the difference between the target speed and the present running speed depending on the gradient detected by the gradient detecting means.

The display/indication means may comprise means for displaying/indicating, as the target speed, a running speed to maximize a charging current supplied to the power supply means if the gradient detected by the gradient detecting means is a downhill gradient, and a speed, determined in view of a practical running speed, to minimize a consumed current of the power supply means if the gradient detected by the gradient detecting means is an uphill gradient. The display/indication means can thus indicate a running speed suitable for uphill or downhill running to the rider of the bicycle for greatly increasing the distance that the bicycle can travel.

The control means may comprise means for controlling operation of the regenerating means.

The control means may comprise means for controlling the regenerating means to regenerate electric energy when a running speed of the bicycle is higher than a predetermined level while the bicycle is running on flat terrain.

The control means may comprise means for controlling operation of the regenerating means if the gradient detected by the gradient detecting means is a downhill gradient and controlling running of the bicycle at an optimum running speed depending on the detected downhill gradient.

The regenerating means may comprise means for utilizing part of the electric energy to charge the power supply means when a brake lever is operated. Electric energy can thus be regenerated highly efficiently with a relatively simple arrangement, for further increasing the distance that the bicycle can travel.

The electric motor may comprise a direct-drive electric motor having a rotatable shaft and a stator which are directly coupled to a front wheel, and an outer rotor rotatable in unison with the front wheel, the direct-drive electric motor serving as the regenerating means. The electric motor can thus be used as the regenerating means, making it possible to simplify the bicycle structure, so that the bicycle can be lightweight and highly efficient.

According to the present invention, there is also provided a bicycle with a power assisting function, comprising an electric motor for adding part of propulsive forces to manual forces to assist in the manual forces, power supply means for supplying electric energy to the electric motor, manual force detecting means for detecting manual forces as propulsive forces, and control means for controlling operation of the electric motor depending on the magnitude of the manual forces detected by the manual force detecting means, the electric motor comprising a direct-drive electric motor having a rotatable shaft and a stator which are directly coupled to a front wheel, and an outer rotor rotatable in unison with the front wheel, the direct-drive electric motor being operable as an electric generator with extra manual forces for utilizing part of regenerated electric energy to charge the power supply means. The electric motor can thus be used as the regenerating means, making it possible to simplify the bicycle structure, so that the bicycle can be lightweight and highly efficient.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a table showing charged quantities at the time the bicycle runs downhill for 1 km at different speeds with an electric motor used to generate electric power;

FIG. 6 is a table showing consumed currents of the electric motor when the bicycle runs uphill for 1 km;

FIG. 11 is a table showing simulated values of traveled distances with respect to gradients and total resistances;

FIGS. 12A and 12B are tables showing simulated values of traveled distances with respect to tire diameters at fixed total resistances;

DETAILED DESCRIPTION OF THE PREFERRED EMBODIMENTS

Figure 1:
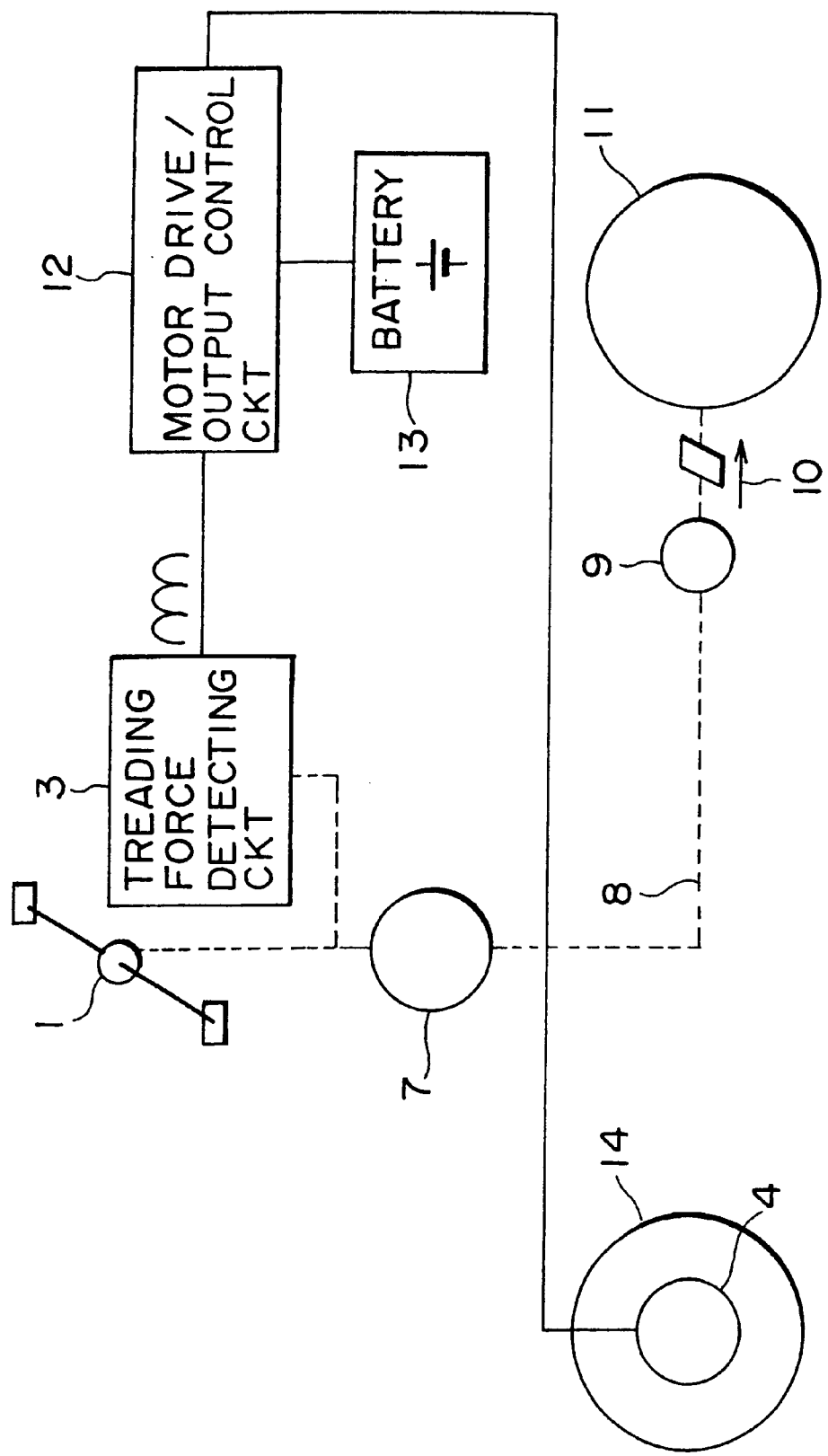
FIG. 1 is a block diagram of a basic arrangement of a bicycle with a power assisting function according to a first embodiment of the present invention.

FIG. 1 shows a block diagram showing a basic arrangement of a bicycle with a power assisting function according to a first embodiment of the present invention. As shown in FIG. 1, the bicycle has a crank 1, a treading force detecting circuit 3, an electric motor 4, a crank gear 7, a chain 8, a drive gear 9, a one-way clutch 10, a manually operated drive wheel 11, a motor drive/output control circuit 12, a battery 13, and a motor-operated drive wheel 14.

The treading force detecting circuit 3 may be dispensed with, and treading forces can be alternatively detected by the inverse operation from the running conditions of the bicycle. For an easier understanding of the invention, however, it is assumed that the bicycle includes the treading force detecting circuit 3.

The present embodiment resides in that the electric motor 4 is rotated by the motor-operated drive wheel 14 to operate as an electric generator for charging the battery 13. Since a power transmission apparatus such as gears needs to be connected all the time, the electric motor 4 is required to have a very small idling loss.

As described above, the idling loss of the electric motor comprises a hysteresis loss of iron, a bearing loss, a windage loss, a brush friction loss, etc., with the hysteresis loss and the brush friction loss particularly become a problem.

According to the present embodiment, the idling loss is reduced by using a brushless electric motor to eliminate the brush loss, a coreless electric motor to eliminate the hysteresis loss, and a direct-drive electric motor to eliminate an increase the loss at higher-speed gears.

Figure 16:
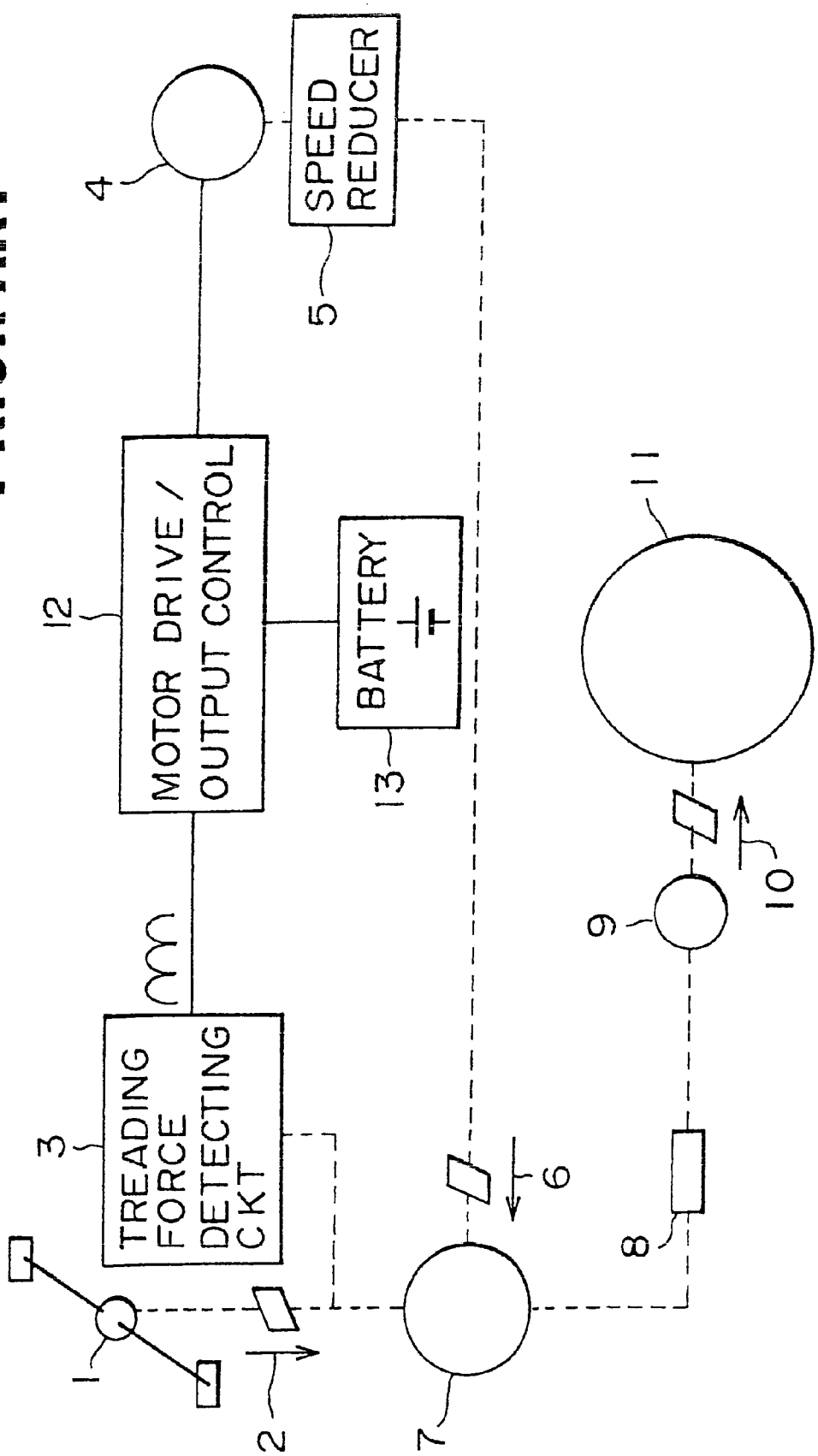
FIG. 16 is a block diagram of a basic arrangement of a conventional bicycle with a power assisting function.
Figure 17:
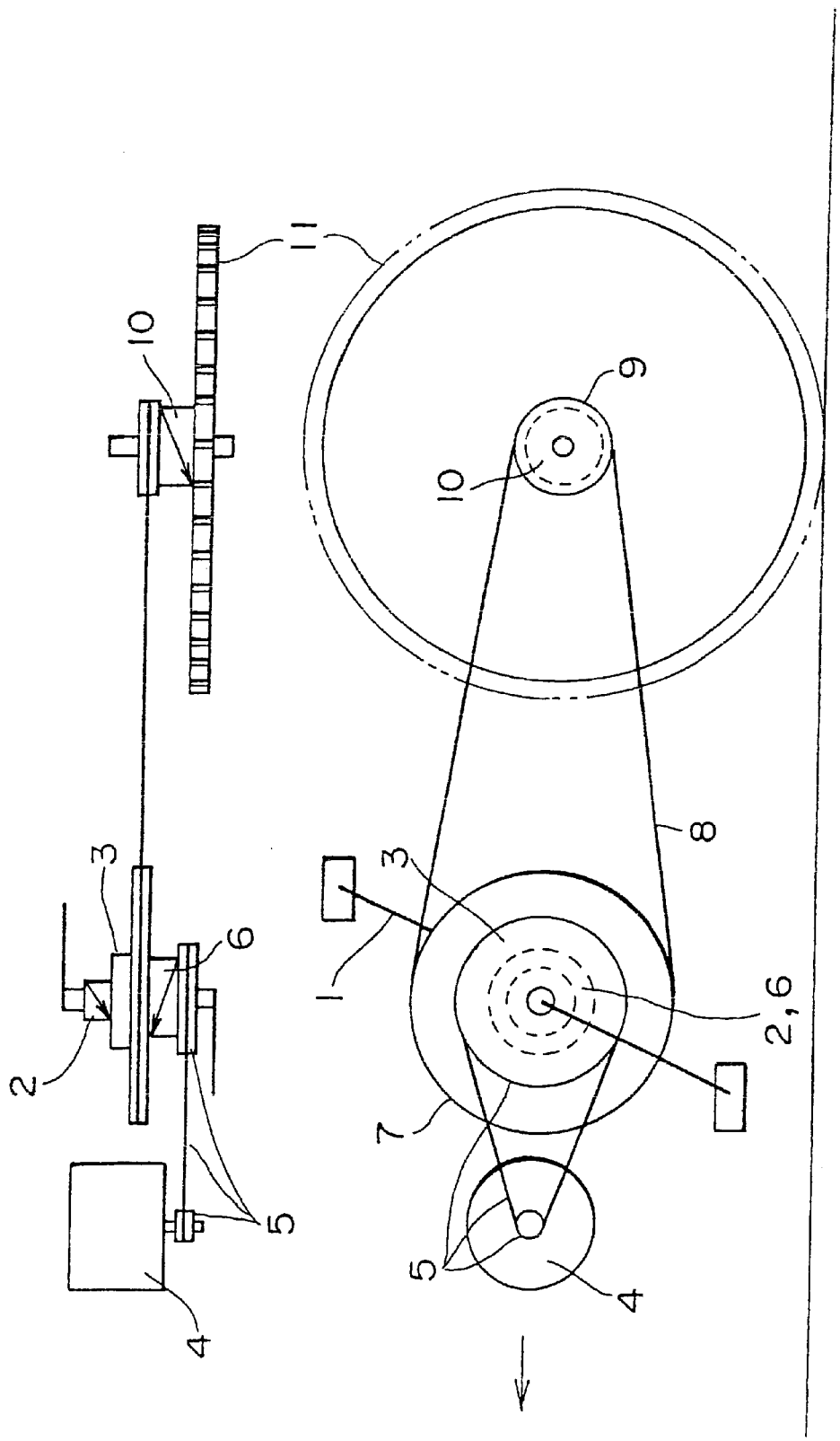
FIG. 17 is a schematic view showing the concept of power transmission of the conventional bicycle with a power assisting function.

In FIG. 1, the bicycle incorporates a front drive mechanism in which a direct-drive electric motor 4 is mounted on the front wheel of the bicycle. The front drive mechanism is effective in making the overall bicycle arrangement highly simple. Since the electric motor 4 drives the front wheel, mechanisms related to the crank gear 7 are simplified, making unnecessary the one-way clutches 2, 6 shown in FIG. 16. The one-way clutch 10 serves to prevent the crank 1 from being rotated by the drive wheel 11 while the bicycle is running.

The electric motor 4 mounted on the front wheel is an outer-rotor type in which the rotatable shaft thereof is fixed to the fork of the front wheel with the outer rotor thereof being rotatable in unison with the front wheel. The spokes of the front wheel are attached to an outer circumferential surface of the outer rotor.

Since the electric motor 4 rotates all the time while the bicycle is running, it is designed to reduce the idling loss as much as possible. The electric motor 4 has no brush with no brush loss, has an armature core designed for as small a hysteresis loss as possible, and is constructed to reduce small rotational speed irregularities due to the armature core and the field system thereby to make vibrations inappreciable while the bicycle is running.

In the present embodiment, the electric motor 4 comprises a brushless, direct-drive electric motor.

Basic ideas of running resistance, traction forces, and power assistance will be described below.

The running resistance to the bicycle can be represented by rolling resistance+windage loss resistance+gradient resistance.

The running resistance R [N] is expressed by the following representative equation which includes coefficients of these resistances:

$$R = 2 \times 2.7 + 0.027 \times V^2 + 9.8 \times W \times \sin\theta$$

where V is the speed [km/h], W the total weight [kg], and θ the gradient [°]. This equation has been simplified to ignore the following factors insofar as their omission poses no practical problems:

Changes in the rolling resistance due to the weight of the rider are ignored.

Changes in the windage loss resistance due to the physique of the rider are ignored.

The cos θ component related to the gradient resistance is omitted.

Figure 2:
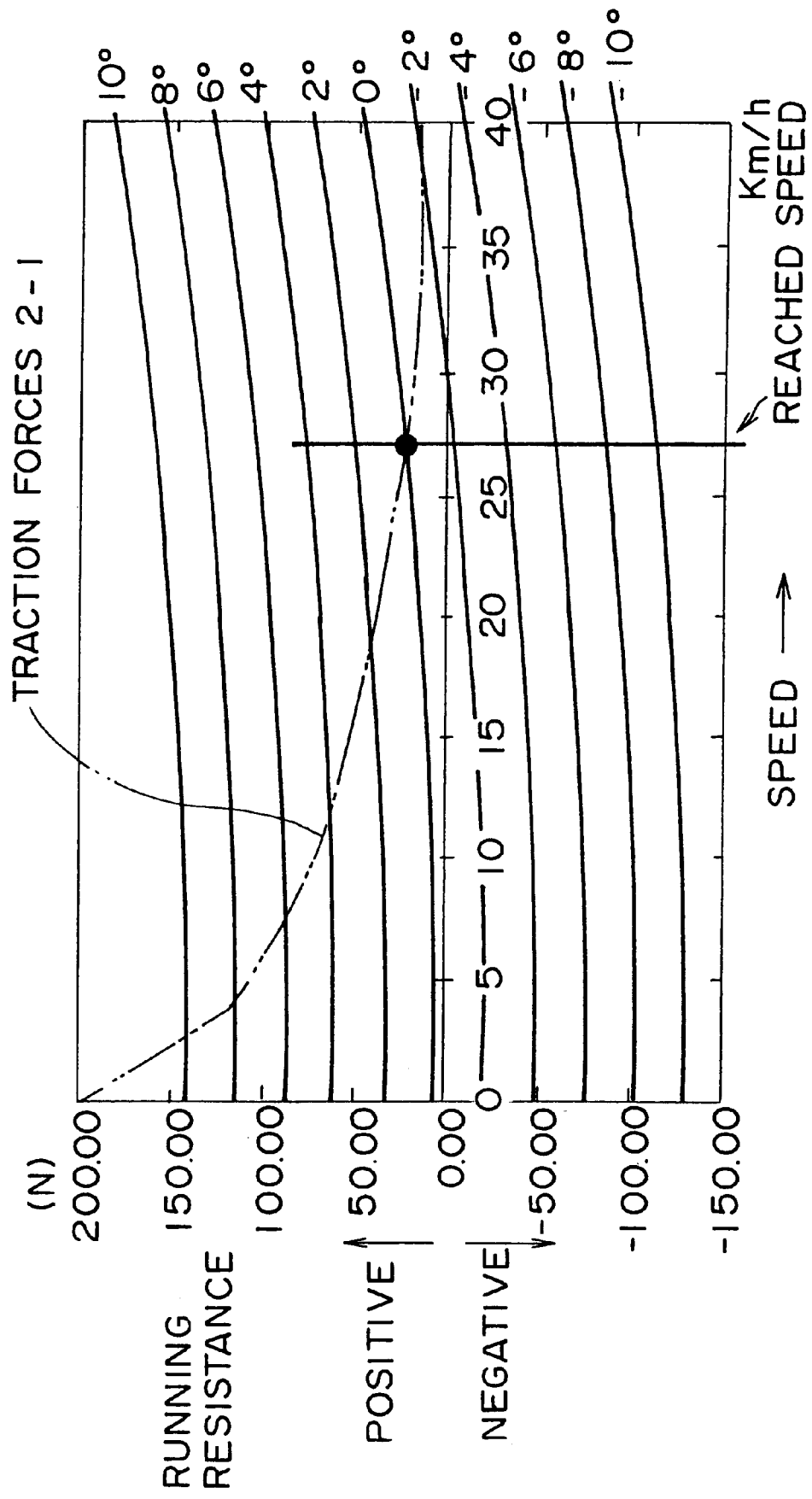
FIG. 2 is a diagram showing the relationship between running resistances, traction forces, and speeds of the bicycle with the power assisting function.

FIG. 2 shows the relationship between the running resistances, traction forces, and speeds when the total weight is 80 kg. In FIG. 2, the running resistance increases quadratically. When the gradient and the weight increase, the curve is shifted upwardly. Since the total weight is determined as 80 kg, only the gradient is indicated as a parameter. When the gradient becomes downhill (negative), the curve is shifted downwardly. If the traction forces are greater than the running resistance, then the bicycle is accelerated until a state of balance is reached when the traction forces become equal to the running resistance. The bicycle is decelerated when the traction forces are smaller than the running resistance.

For example, if the traction forces are applied according to a traction force curve 4-1 and the bicycle runs on flat terrain (gradient: 0°), then the speed (about 27 km/h in this embodiment) of the bicycle is reached when the running resistance at 0° and the traction force curve 4-1 cross each other.

At a gradient of −2° (downhill), when the speed is low, since the gradient forces are negative, the bicycle is accelerated without the application of forces, and the running resistance increases with the speed, and a state of balance is reached when the traction forces become equal to the running resistance (about 28 km/h in this embodiment).

Human beings produce variety of traction forces depending on the traction force duration, age, sex, training experience, physique, etc.

When the speed is lower, the traction forces are larger. As the speed is higher, the traction forces become smaller.

Generally, traction forces that can be produced for a long time are about 50 W, and traction forces that can be produced for a short time are about 200 W. It has been said that persons who have been trained are capable of producing traction forces several times greater than the above values.

Figure 3:
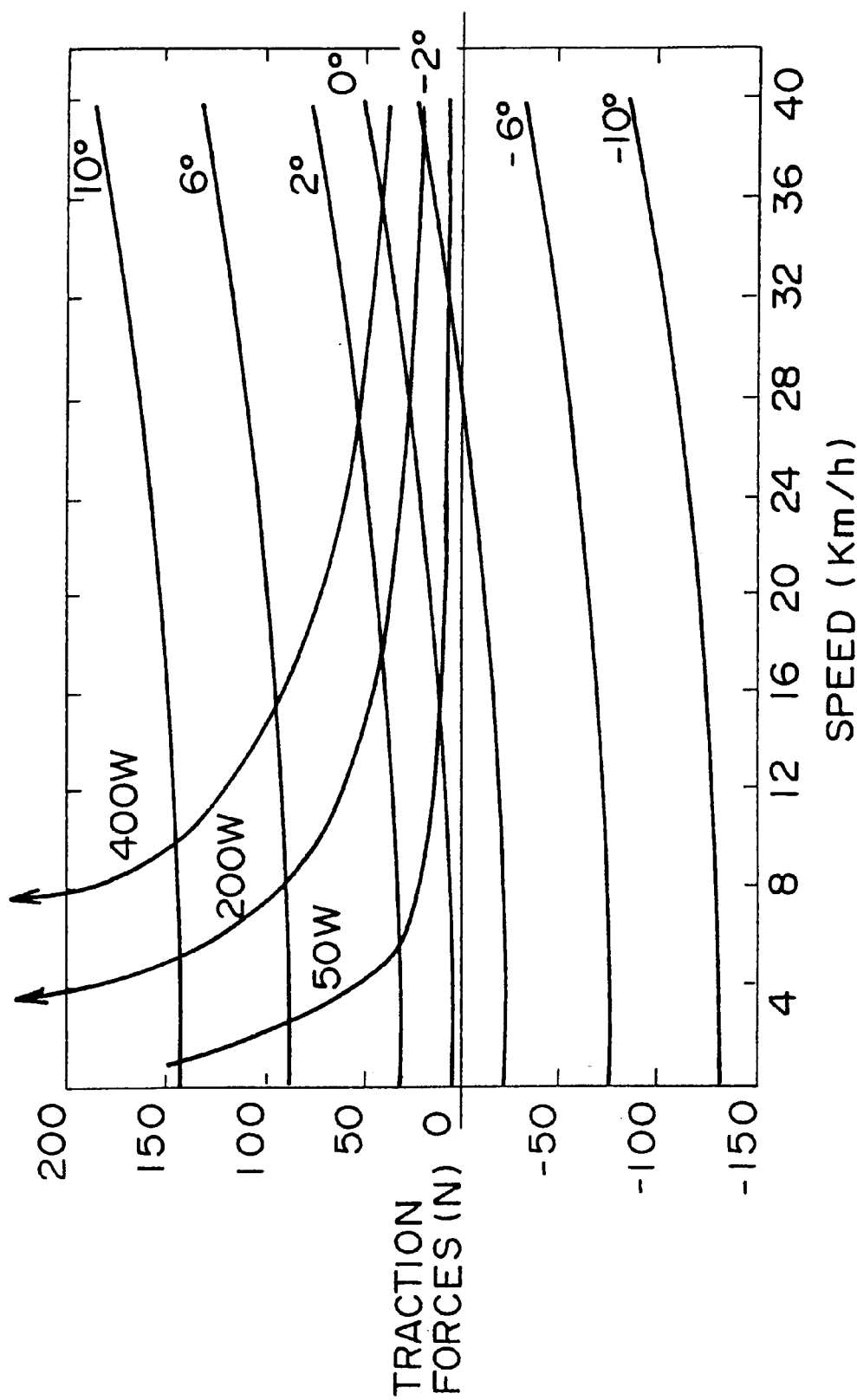
FIG. 3 is a diagram showing the relationship between traction forces and speeds of the bicycle with the power assisting function at different output levels.

FIG. 3 shows the relationship between traction forces and speeds of the bicycle at different output levels, illustrating the magnitudes of the traction forces of 50 W, 200 W, and 400 w. Since the output levels are calculated as the product of the speed and the traction forces, as the speed is lower, the traction forces become greater, and the traction forces are infinitely large when the speed is nil. Of course, forces that are produced by human beings are finite in magnitude and speed, and have different characteristics from the illustrated characteristics of constant output levels. It can be seen from FIG. 3 that even with the output level of 50 W, the bicycle can run at a speed of ten and several km/h on flat terrain.

Figure 4:
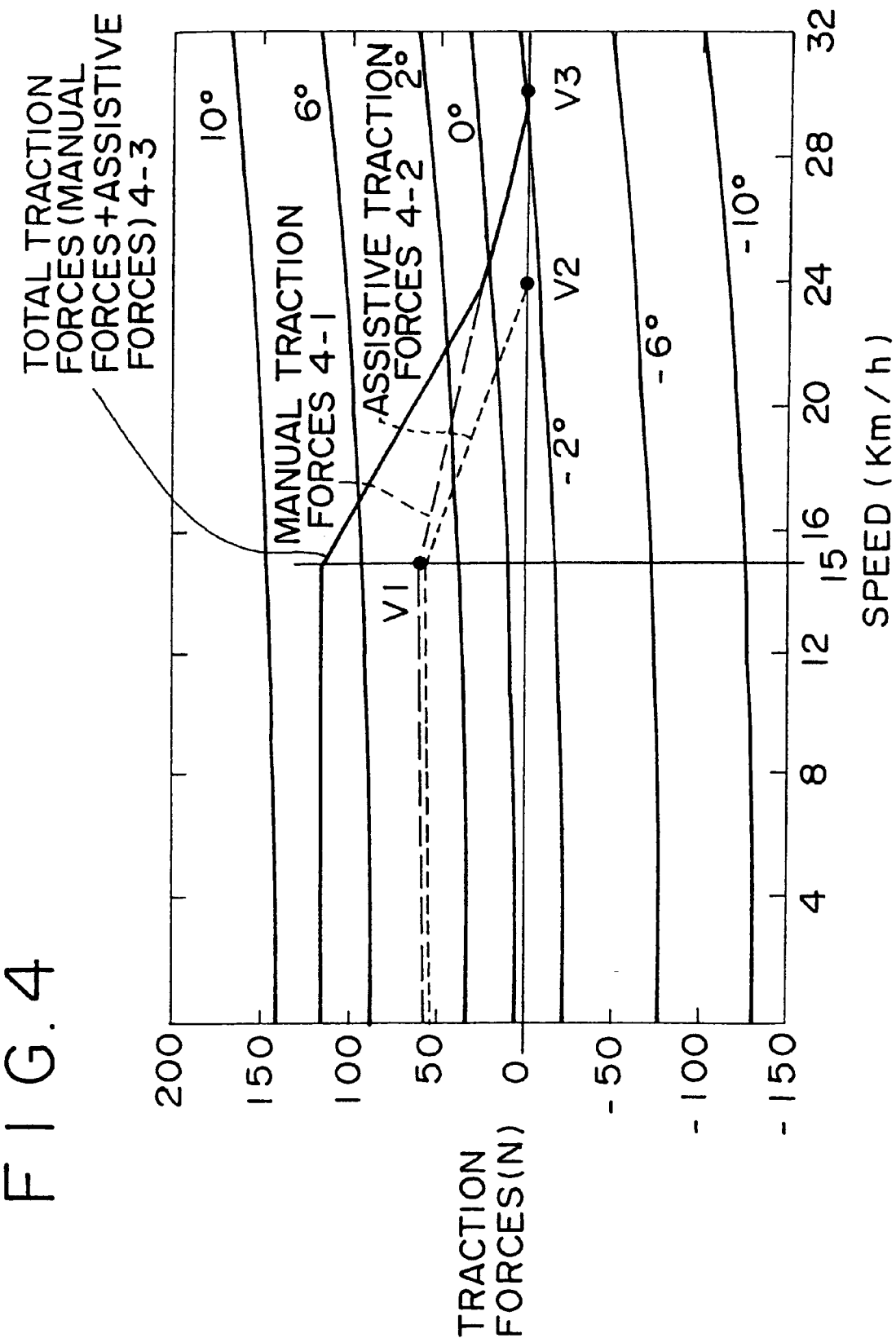
FIG. 4 is a diagram showing the relationship between simulated manual traction forces and assistive traction forces of the bicycle with the power assisting function.

Basics of manual forces and assistive forces will be described below. Since manual traction forces are complex and cannot uniquely be expressed as described above, they are represented in a simulated manner as shown in FIG. 4. FIG. 4 shows the relationship between simulated manual traction forces and assistive traction forces of the bicycle. A manual traction force curve 4-1 represents manual (treading) traction forces, which are constant up to a speed V1, decreases beyond the speed V1, and becomes nil at a speed V3.

An assistive traction force curve 4-2 represents traction forces generated by the electric motor, which are the same as the manual traction forces up to the speed V1, decreases beyond the speed V1, and becomes nil at a speed V2. The speeds V1, V2 are indicated as 15 km/h and 24 km/h, respectively, as is conventional. The speed V3 is not a predetermined value, and is indicated as 30 km/h.

A total traction force curve 4-3 represents total traction forces indicative of the sum of the manual traction forces and the assistive traction forces. The total traction forces are twice the manual traction forces up to the speed V1, decrease beyond the speed V1, and are equal to the manual traction forces beyond the speed V2.

When the bicycle shown in FIG. 1 runs downhill, since the electric motor 4 is directly connected to the front wheel, the electric motor 4 operates as an electric generator. If the generated electric power is returned to the battery 13 in some way, then the battery 13 is charged, increasing the distance that the bicycle can travel while being assisted.

In order to obtain a charging current even when the voltage of the electric power generated by the electric motor 4 is lower than the voltage of the battery, the bicycle needs a control circuit with a boosting function. In this embodiment, a control circuit for controlling the DC brushless electric motor is arranged for bidirectional control such that when the electric motor is controlled by electric energy from the battery 13, the voltage of the electric energy from the battery 13 is lowered, and when the battery 13 is charged by electric energy generated by the electric motor, the voltage of the electric energy generated by the electric motor is increased. An example of the control circuit will be described below.

Beyond a certain speed, the electromotive forces of the electric motor are higher than the battery voltage, and hence a charging current is available even when the voltage of the generated electric energy is not increased. While the charging current is flowing, because the bicycle is subject to regenerative braking, the bicycle undergoes decelerating forces.

Thus, when the bicycle runs downhill at a certain speed, the battery on the bicycle can be charged. The amount of electric energy by which the battery can be charged differs depending on the gradient of the downhill slope and the speed or the like.

FIG. 5 shows charged quantities at the time the bicycle runs downhill for 1 km at different speeds with an electric motor which has the following specifications:

Main specifications of the electric motor:
Type: DC brushless electric motor
Rated voltage: 28.8 V
No-load current: 0.5 A
Torque constant: 12 kg-cm/A
Internal resistance: 0.4 Ω
Other specification:
Battery internal resistance: about 0.16 Ω, line resistance: about 0.08 Ω(including the control circuit)
Control circuit loss: about 3 W (constant)

In FIG. 5, the charged quantity is maximum in cells that are indicated by the bold lines. At the gradient of −2°, the charged quantity is maximum at about the speed of 14 km/h. As the downhill gradient increases, the speed at which the maximum charged quantity is obtained increases. When the speed increases at a lower gradient, the running resistance increases, and the electric energy available for charging the battery decreases. When the bicycle runs a steep downhill slope at a low speed, the charged quantity decreases because of an IIR loss due to a large current and an insufficient amount of generated electric power because of a low rotational speed of the electric motor.

Blank cells at lower speeds in FIG. 5 indicate that the electric motor fails to produce braking forces that can keep those lower speeds. Stated otherwise, since the voltage of the generated electric power is low, no braking currents capable of keeping the lower speeds can flow.

Consumed currents when the bicycle runs uphill are given in the table shown in FIG. 6.

FIG. 6 shows consumed currents of the electric motor when the same traction forces as those produced by the electric motor are manually generated.

For the bicycle to run uphill, there are speeds where the consumed current is minimum depending on the gradient (see cells indicated by bold lines). The consumed current is larger at lower speeds and higher speeds because the motor is used with low efficiency at lower speeds, and the windage loss increases and the running resistance increases at higher speeds. Furthermore, since minimum values may exist at impractical speeds depending on the design of the motor and the drive system, speeds that do not suffer practical problems have to be selected.

As the gradient increases, the minimum consumed current speed increases. This is because the ratio of an increase in the windage loss to the gradient resistance becomes smaller as the gradient is greater.

Cells represented by a bar indicate that the rotational speed is too low for the bicycle to run at the speed with the preset battery voltage (28.8 V)

Consumed currents and distances that the bicycle can travel when the bicycle runs uphill and downhill in the examples shown in FIGS. 5 and 6 will be described below.

If the bicycle runs uphill at a speed for the minimum consumed current and downhill at a speed for the maximum regenerated current, then when the bicycle runs uphill at a gradient of 2° for 1 km at a speed of 10 km/h, the consumed current is minimum, and the battery is discharged at a rate of 0.223 Ah, and when the bicycle runs downhill at a gradient of 2° for 1 km at a speed of 10 km/h, the regenerated current is maximum, and the battery is charged at a rate of 0.133 Ah.

When the bicycle runs in one cycle uphill for 1 km and downhill for 1 km, the current of 0.223−0.133=0.090 Ah is consumed. If the fully charged capacity of the battery is 5 Ah, the bicycle can run for:

2*5/0.09=111 [km]

This distance is a large improvement over the distance that the bicycle could run without any regenerative function because the latter distance is:

2*5/0.223=45 [km].

The above result is obtained because good running conditions are selected. If running conditions are not taken into account, then there may be instances where substantial advantages can be achieved from the regenerative function. For example, if the bicycle runs uphill slowly at a speed of about 6 km/h, and runs downhill at a higher speed of 24 km/h, then a current of 0.233 Ah is consumed from the battery in the uphill running, and a current of 0.045 Ah is regenerated in the downhill running, resulting in a distance of 52 km that the bicycle can run. Accordingly, substantially no advantages can be achieved.

The speed at which optimum advantages can be achieved varies depending on various factors including the motor characteristics, the weight, and the running resistance. The gradient as well as the total weight of the bicycle will affect the optimum speed.

The gradient can be detected by a sensor, and the weight can be calculated from the gradient and the acceleration. A process of determining the total weight m of the bicycle will briefly be described below.

1) If a manual force detecting means detects a total weight from the gradient and the acceleration, rather than the treading forces, an accelerating/decelerating force (f) is determined from the motor torque, the gradient, and the known running resistance when no manual forces are available judging from the rotation of the crank, and the total weight m is determined from the accelerating/decelerating force (f) and an acceleration/deceleration (α: a rate of change of the speed) as follows:

m=f/α

2) If the treading force detecting circuit is available, then an accelerating/decelerating force (f) is determined from the manual forces, the motor power, the gradient, and the running resistance, and the total weight m is determined from the accelerating/decelerating force (f) and the acceleration/deceleration α according to the above equation.

Figure 7:
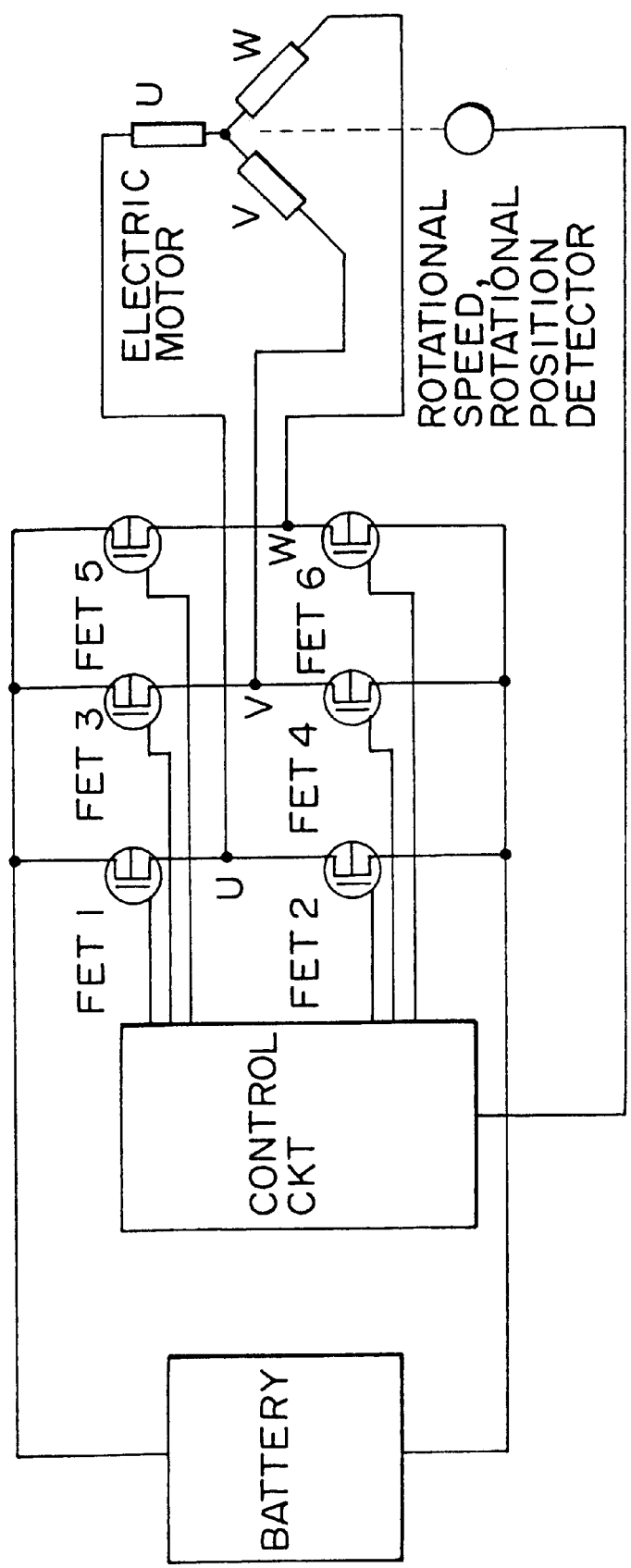
FIG. 7 is a block diagram of a control circuit for a brushless electric motor.

A control circuit and regenerative control of an brushless electric motor will be described below with reference to FIGS. 7, 8, and 9.

Controlling the brushless electric motor will briefly be described below.

In an ordinary DC electric motor with a brush, the brush is held in sliding contact with a switching device known as a commutator to supply a current to an armature. The brush and the commutator changes the directions of currents in coils at positions where the polarities of magnets change such that the electric motor rotates in one direction.

In a brushless electric motor, the brush and the commutator are replaced with a control circuit comprising electric switching devices such as FETs, and the control circuit changes currents in coils in response to a positional signal which switches between magnets and coils. The control circuit for the brushless electric motor operates basically in the same manner as a control circuit for a three-phase synchronous electric motor. FIG. 7 shows a block diagram the control circuit for the brushless electric motor.

Figure 8:
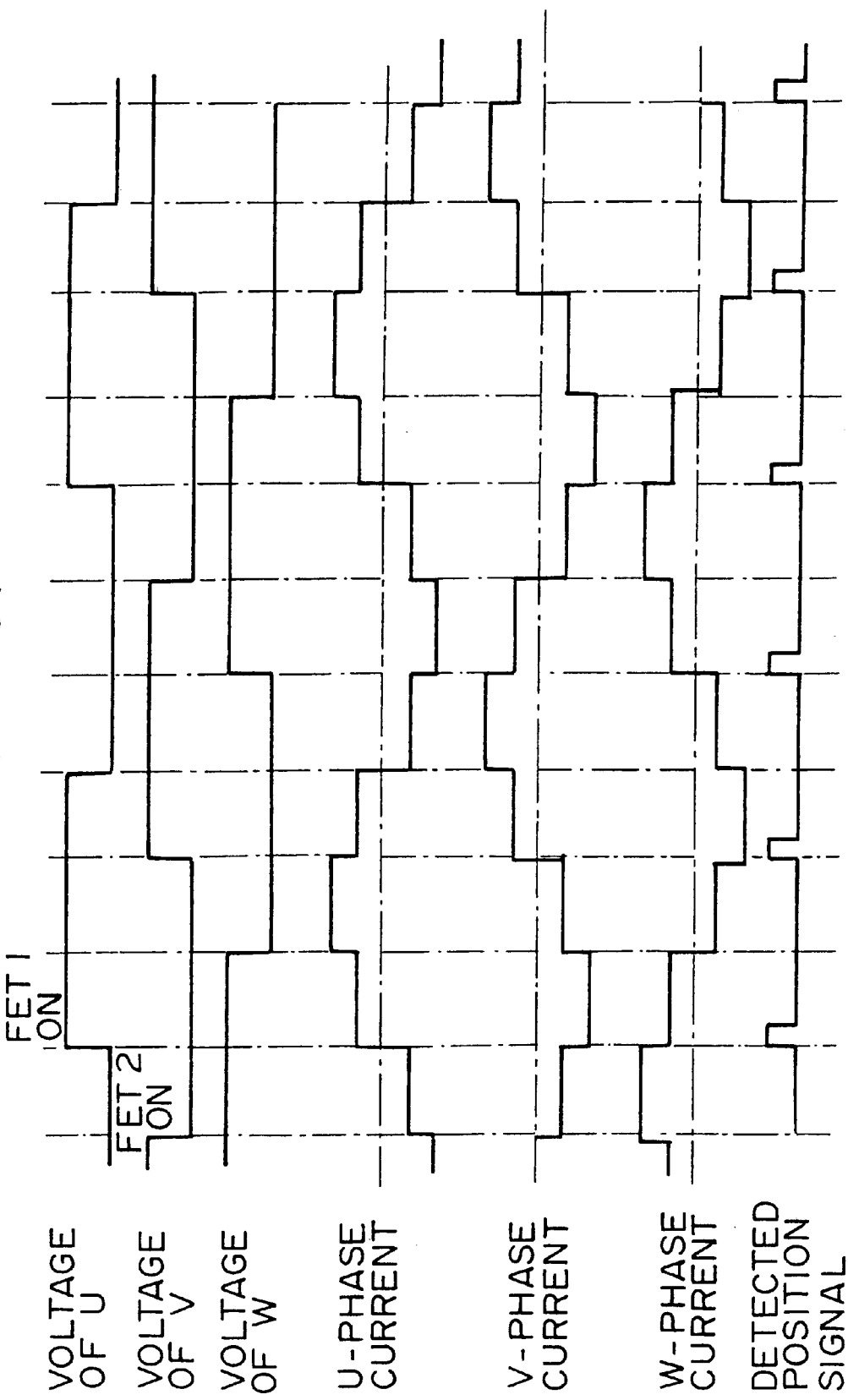
FIG. 8 is a diagram of voltage, current, and signal waveforms in the control circuit.
Figure 9:
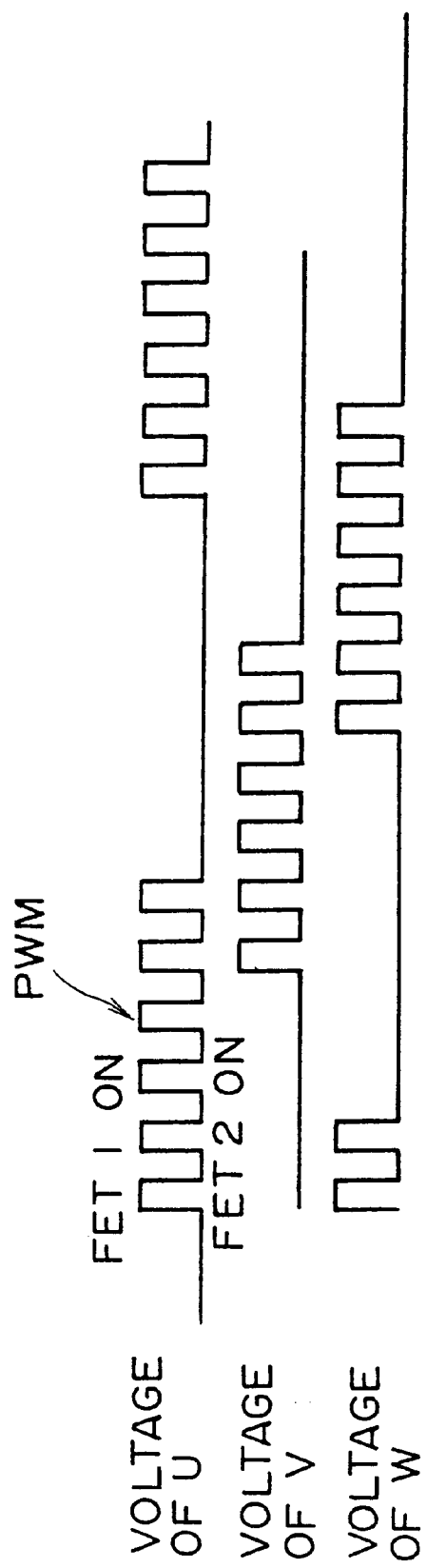
FIG. 9 is a diagram showing the waveforms of voltages of U, V, W phases produced when the brushless electric motor is under PWM control.

FIG. 8 shows voltage, current, and signal waveforms in the control circuit. U, V, W phases corresponding to the respective three phases are supplied with respective voltages U, V, W by switching devices FET 1, FET 2, . . . , FET 5, FET 6. The voltage U will be described by way of example below. The control circuit supplies gate signals to the FETs such that the FET 2 is turned off when the FET 1 is turned on, and the FET 2 is turned on when the FET 1 is turned off. When the FET 1 is turned on, the voltage U is equal to the battery voltage+the voltage across the FET 1, and when the FET 2 is turned on, the voltage U is equal to the battery voltage−the voltage across the FET 2 (GND). A current flowing through the U phase has positive and negative values in relation to the voltages of the other phases, as indicated by the U-phase current in FIG. 8. Similarly, currents flowing through the V and W phases has positive and negative values as indicated by the V-phase current and the W-phase current in FIG. 8. These phase currents are 120° out of phase with each other, producing a revolving magnetic field to rotate the electric motor.

PWM motor control and regenerative control will be described below.

When the switching devices of the control circuit are PWM-controlled, the voltages can be varied. FIG. 9 shows the waveforms of voltages of the U, V, W phases under PWM-control. In the example shown in FIG. 9, the battery voltage is of a 50% duty cycle (one half voltage).

Figure 10:
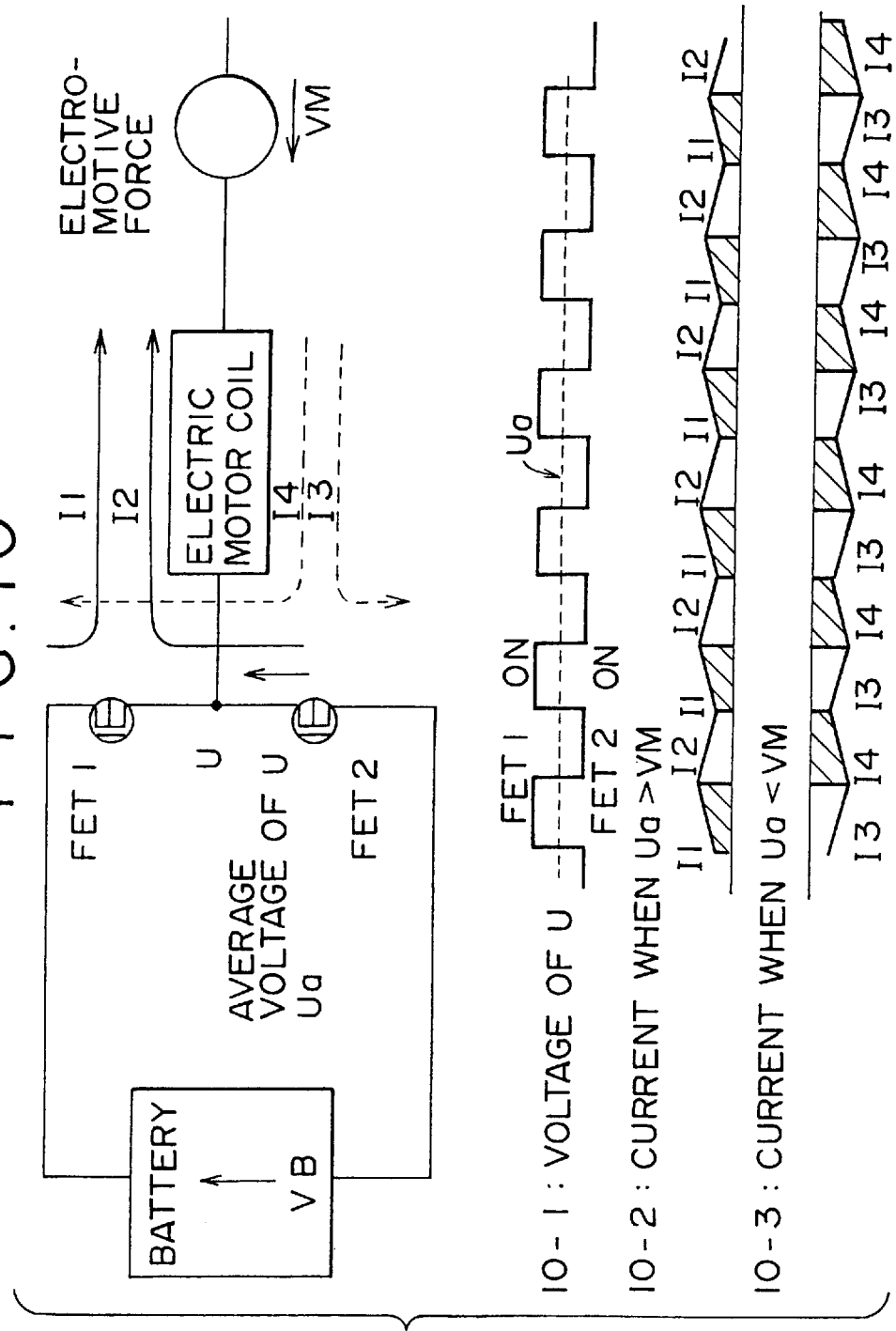
FIG. 10 is a diagram showing a current control process and current waveforms at the time the brushless electric motor is energized and operated in a regenerative mode under PWM control.

FIG. 10 shows a current control process and current waveforms for only the U phase at the time the brushless electric motor is energized and operated in a regenerative mode under PWM control. The current control process will be described below with reference to FIG. 10.

The 50% duty cycle means that in the period in which a current is to flow in the electric motor, i.e., in the period in which the FET 1 is turned on at the voltage U in FIG. 8, the period in which the FET 1 is turned on, i.e., the FET 2 is turned off, constitutes one half, and the period in which the FET 2 is turned on, i.e., the FET 1 is turned off, constitutes one half. See the waveform 10-1 in FIG. 10.

When the electromotive force (VM) of the electric motor is lower than the average voltage (Ua) of the U phase, a current flows through a path I1 when the FET 1 is turned on (the FET 2 is turned off), and a current flows through a path I2 when the FET 2 is turned on (the FET 1 is turned off). Thus, a continuous current in a direction to energize the electric motor flows through the coils of the electric motor. The current has the waveform 10-2 in FIG. 10.

Operation of the electric motor in a regenerative mode will be described below. When the electromotive force (VM) of the electric motor is higher than the average voltage (Ua) of the U phase, no current flows through the path I2, but an opposite current flows through a path I3 when the FET 1 is turned off (the FET 2 is turned on), and a current flows through a path I4 in a direction to charge the battery when the FET 1 is turned on (the FET 2 is turned off). The current has the waveform 10-3 in FIG. 10. Areas shown hatched in the waveforms 10-2, 10-3 represent currents flowing in the battery.

Therefore, even when the electromotive force of the electric motor is lower than the voltage of the battery, it is possible to supply a regenerated current to the battery insofar as the electromotive force is higher than the average voltage under PWM control.

The regenerated current (charging current) flows to the same extent as the motor-energizing current (discharging current), the battery needs to be chargeable with a large current. The battery may comprise a lead battery, a Ni—Cd battery, a Ni—MH battery, a lithium (ion) battery, or the like. A battery with less limitations on the charging current is selected for the above reasons.

In the above current control process, simple rectangular currents which are supplied 180° have been described. In actual applications, however, in view of the characteristics of the electric motor used, it is preferable that rectangular currents which are supplied 120° be employed and waveforms modified into sine waveforms under PWM control be employed.

The present embodiment resides in the power transmission mechanism controllable in the regenerative mode, the control circuit for controlling the electric motor in the regenerative mode, and a display (indicator) unit for running states and running conditions.

It has been described above that the distance that the bicycle can travel can be increased when the bicycle runs at an optimum speed depending on uphill and downhill gradients.

However, the rider of the bicycle finds it difficult to accurately feel the gradient of a slope on which the bicycle is presently running, and may differently feel uphill and downhill gradients due to illusions and body conditions.

To avoid such a shortcoming, running conditions depending on uphill and downhill gradients are displayed (indicated) to the rider to allow the rider to run the bicycle according to the displayed (indicated) running conditions.

The rider treads the pedals or operates the brake lever (whose function will be described later on) according to the displayed information for thereby controlling the speed of the bicycle.

On a downhill slope that the rider can recognize, the bicycle runs downhill at an automatically established speed with the rider not treading the pedals according to its own intention. Even on a downhill slope that the rider cannot recognize, the rider can run the bicycle under suitable conditions by following the displayed information.

The running conditions are determined primarily by way of calculations (or based on a table) based on information representing a detected gradient, detected treading forces, and if necessary, a temperature, and a battery capacity (not shown).

The information may be displayed in any of various ways. For example, the difference between the calculated running conditions and the present operating conditions may be displayed, or the calculated running conditions and the present operating conditions may directly be displayed, or whether the difference is being eliminated or increased may be displayed, or the information may visually or audibly be displayed. Any of these display processes may be employed insofar as it can effectively give the rider information for optimally running the bicycle.

A process of increasing the distance that the bicycle can travel in the regenerative mode will be described below.

As described above, the distance that the bicycle can travel can be increased by running up and down a slope of a certain gradient. However, when the bicycle runs on flat terrain, the distance that the bicycle can travel cannot be increased because there is no opportunity available for the regenerative mode. When the bicycle runs on flat terrain at a certain speed or higher, the bicycle is reversely power-assisted to operate in the regenerative mode so that electric energy can be generated in the regenerative mode even when the bicycle runs on flat terrain. Since the forces required to run the bicycle on flat terrain are small, no appreciable load is imposed on the manual forces.

It is also effective for the bicycle to require the same manual forces on slight downhill running as flat terrain running. Such a requirement does not make the rider feel awkward because the rider cannot recognize slight downhill gradients.

In the present system, great importance is attached to the system efficiency. It is important to minimize mechanical losses including the rolling resistance of the electric motor, the transmission mechanism, and the wheels, and the windage loss of the rider and the bicycle body, and electrical losses of the battery, the control circuit, and the electric motor. If these losses are small, the amount of the electric current required to run the bicycle uphill is reduced, and the amount of the electric current generated in the regenerated mode when the bicycle runs downhill is increased.

Reducing the electrical losses, for example, will be described below.

Since a typical electrical loss is a resistance, distances that the bicycle can travel at various gradients as the resistances of the electric motor and the lines, and the battery internal resistance are reduced are simulated. The results of the simulation are shown in FIG. 11. The total resistance is indicated by:

Total resistance=the internal resistance of the electric motor+the resistance of the control circuit when the device are turned on+the wire resistance+the internal resistance of the battery.

As the electric resistance (total resistance) is reduced, the distance that the bicycle can travel is increased until it becomes infinitely large. No improvement is achieved by the reduced electric resistance when the bicycle runs on flat terrain, but a greater improvement is achieved by the reduced electric resistance when the bicycle runs on slopes having gradients.

Actual resistances are 0.38 Ω for the electric motor, 0.04 Ω for the control devices, 0.03 Ω for the line, and 0.16 Ω for the battery, resulting in a total resistance of about 0.6 Ω. It is highly difficult to reduce the total resistance from 0.6 Ω to about 0.1 Ω.

It can, however, be understood that the distance that the bicycle can travel can greatly be increased by reducing the resistance, though not so great, and improving the other losses.

Traveled distances of bicycles having electric motors of the same specifications being mounted on small wheels, with the present total resistance of 0.6 Ω and an easily achievable total resistance of 0.52 Ω, are shown in FIGS. 12A and 12B.

When the electric motor is mounted on small tires, great advantages can be achieved even if the internal resistance is of a present level. The speed at which the advantages can be achieved is lower than that with a bicycle having a 24-inch tire, but is in the range from 10 km/h to 15 km/h which is practically a bit low.

However, the original requirement that the bicycle be power-assisted up to 25 km/h cannot be met. It is effective to increase the rotational speed of the electric motor by effecting field-weakening control on the electric motor, increasing the voltage of the battery, and using a transmission. Since reducing the tire diameter is equivalent to incorporating a transmission, it is possible to employ an efficient speed reducer (transmission) and tires of large diameter.

Employing small-diameter tires means using higher rotational speeds of the electric motor and higher efficiency thereof. Since the speed of the bicycle is reduced, the windage loss is reduced, including the efficiency while the bicycle is running, with the result that the distance that the bicycle can travel is increased.

Figure 13:
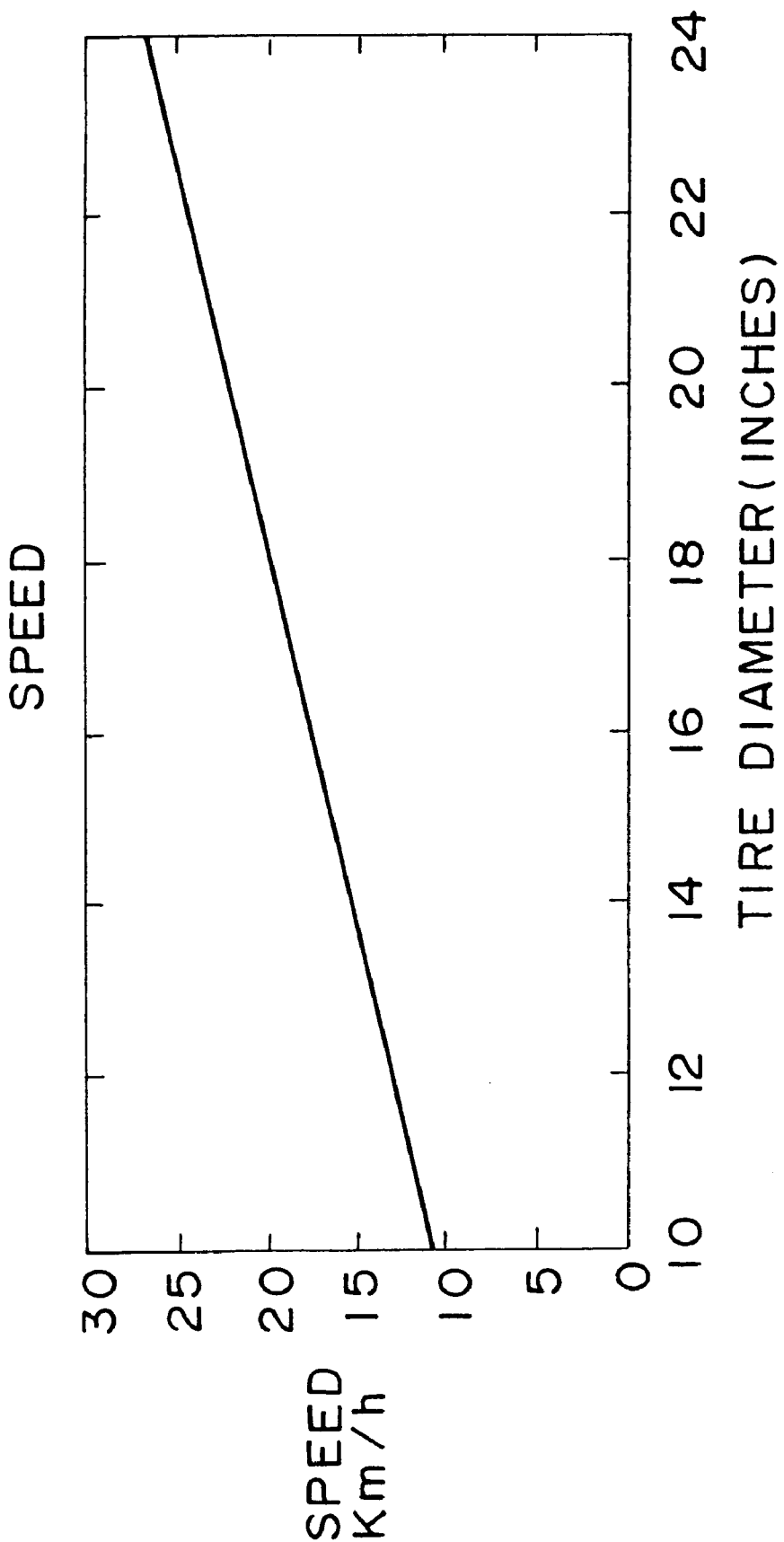
FIG. 13 is a diagram showing the relationship between maximum speeds and tire diameters.

The relationship between maximum speeds and tire diameters will be described. FIG. 13 shows the relationship between maximum speeds and tire diameters.

When the tire becomes smaller, the maximum speed is naturally lowered. For example, whereas the maximum speed of the bicycle is about 26 km/h with 24-inch tires, the maximum speed of the bicycle is about 13 km/h with 12-inch tires.

Differences in running characteristics due to different wheel diameters will be described below.

Figure 14:
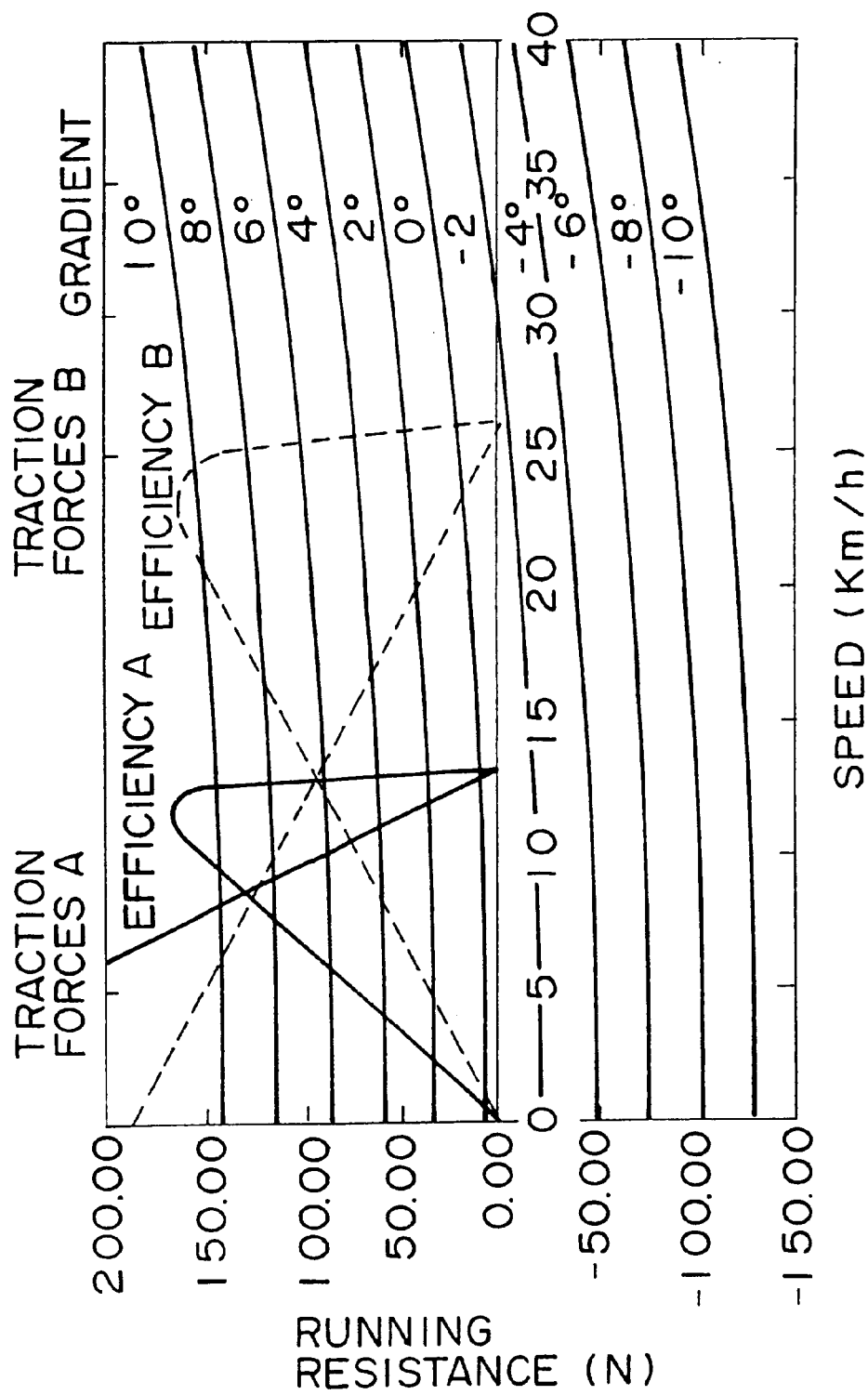
FIG. 14 is a diagram showing running characteristics depending on tire diameters.

FIG. 14 shows running characteristics depending on tire diameters. In FIG. 14, a traction force curve A represents a traction force vs. speed characteristic when a 12-inch tire is used. According to the traction force curve A, as the sped increases, the traction forces are reduced, and become nil when the speed is about 13 km/h. Points of intersection between the traction force curve A and running resistances represent speeds with respect to the gradients. Therefore, the bicycle can run at a speed of only about 12 km/h on flat terrain.

A traction force curve B represents a traction force vs. speed characteristic when a 24-inch tire is used. The bicycle can run at a speed of about 24 km/h.

Inasmuch as the running resistance increases as the speed increases, the running efficiency is better if the bicycle runs at as much a low speed as possible in a stable running speed range. Running the bicycle at a speed of about 10 km/h in view of running stability and running efficiency will be analyzed below.

When a 24-inch tire is used, a low-efficiency region is used in the vicinity of 10 km/h as indicated by an efficiency curve B.

When a 12-inch tire is used, a high-efficiency region is used as indicated by an efficiency curve A, but the maximum speed is limited.

If both the efficiency curves A, B are achieved by the field-weakening control and the transmission, then a high-efficiency region from a low speed to a high speed can be used, making it optimum for increasing the distance that the bicycle can travel. It is best for the bicycle to have a continuously variable transmission between the efficiency curves A, B, and preferable to incorporate several gear ratios between the efficiency curves A, B if speed changes are to be made.

Figure 15:
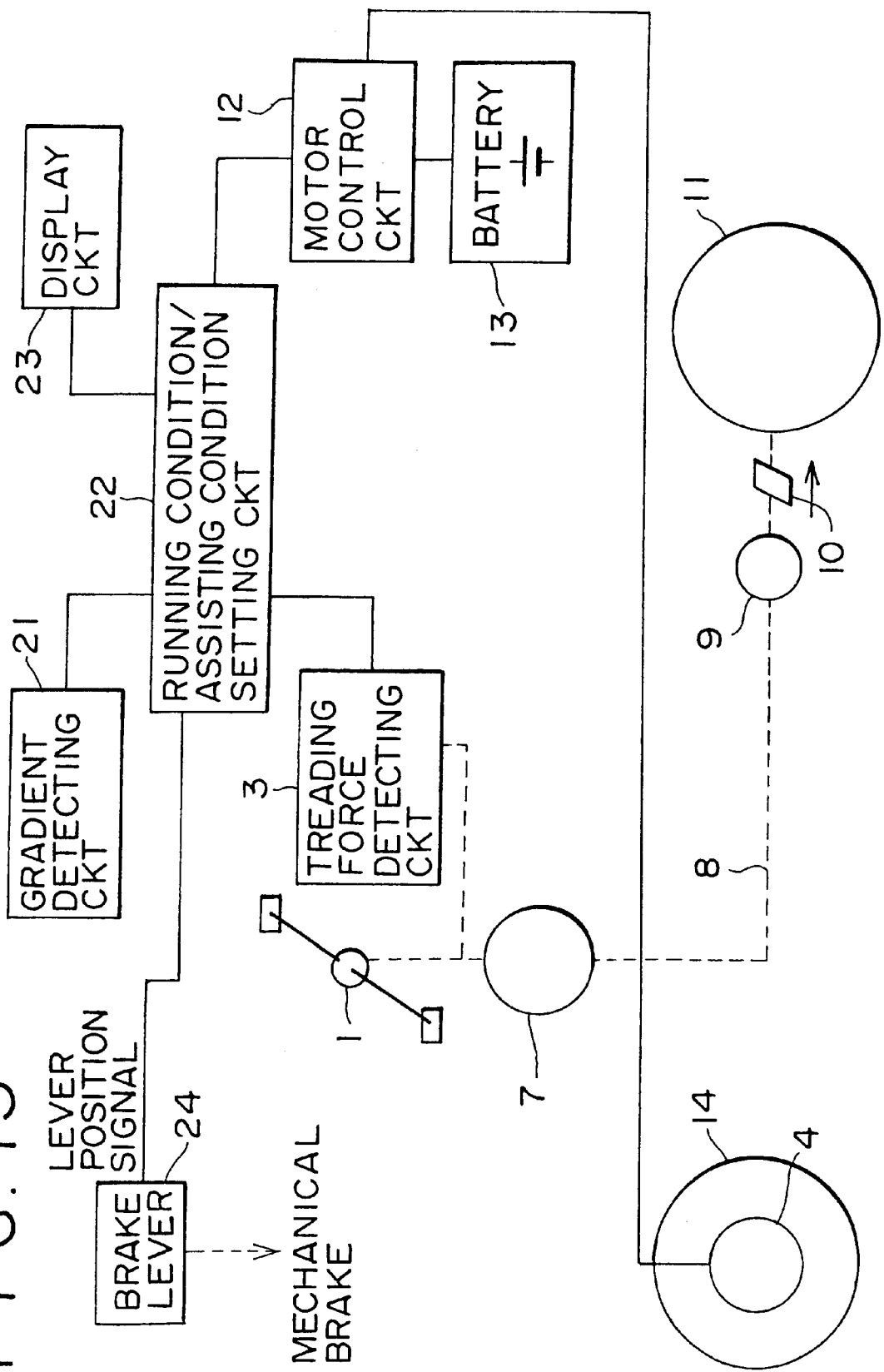
FIG. 15 is a block diagram of a basic arrangement of a bicycle with a power assisting function according to a second embodiment of the present invention.

FIG. 15 shows a block diagram a basic arrangement of a bicycle with a power assisting function according to a second embodiment of the present invention, which incorporates the above functions combined together.

In FIG. 15, the bicycle has a crank 1, a treading force detecting circuit 3, an electric motor 4, a crank gear 7, a chain 8, a drive gear 9, a one-way clutch 10, a manually operated drive wheel 11, a motor drive/output control circuit 12, a battery 13, and a motor-operated drive wheel 14, a gradient detecting circuit 21, a running condition/assisting condition setting circuit 22, a display circuit 23, and a brake lever and a regenerative circuit 24.

The bicycle with the power assisting function according to the second embodiment is summarized as follows:

When a regenerative control process is employed, a current consumed when the bicycle is powered (mainly propelled by the electric motor when running uphill) is supplied in the regenerative control process, increasing the distance that the bicycle can travel.

If the bicycle runs efficiently when it is powered and also when it runs in the regenerative mode, the distance that the bicycle can travel can be increased greatly.

Major examples of efficient bicycle running are speeds matching uphill and downhill gradients.

When running downhill, it is possible to set regenerative braking forces to optimum conditions. When running uphill, however, it is impossible to set forces produced by the rider of the bicycle.

Information is displayed (indicated) to the rider to run the bicycle in optimum conditions according to the intention of the rider.

The optimum conditions need to be considered taking into account a combination of the efficiency of the power system (the electric motor, the transmission apparatus, the control circuit, the battery, etc.) and the running efficiency. To increase the combined efficiency, an efficient transmission and a field-weakening control process are also additionally considered.

While the efficiency of the electric motor is important, it is not sufficient for the bicycle to run in a region where the efficiency of the electric motor is high.

A lithium ion battery is preferable for use in this system as its charging and discharging efficiency is about 100% and any limitations on the charging current are small in principle.

Under conditions in which the combined efficiency is higher than a certain level, the difference between the current consumed when the bicycle is powered the current supplied when the bicycle runs in the regenerative mode is nil, making it possible for the bicycle to run infinitely.

The bicycle can run infinitely over a succession of certain uphill and downhill slopes.

For running on flat terrain and gradual slopes, the profile of the assistive control is slightly modified to make manual forces available for the regenerative mode.

On flat terrain and gradual slopes, since the bicycle needs small forces, any burden on the rider is small, and the rider cannot recognize the degree of the gradient, the rider does not feel awkward and an undue burden.

The bicycle runs in the regenerative mode not only when it runs downhill but also when it is braked to a stop. The regenerative mode may be initiated by an electric switch just before the brake shoe operates when the brake lever is pulled, so that a regenerated current can be obtained.

Rather than the electric switch, a linear detector may be used to detect just before the brake shoe operates for linear regenerative control.

Because the current that can be returned to the battery when the bicycle is braked is very small, the brake lever is effective when the bicycle runs downhill at a speed other than the automatically set speed.

When the bicycle runs a considerably steep downhill slope, a mechanical brake may be operated in combination with the regenerative braking for generating an increased regenerated current.

For increasing the efficiency even to a small degree, since the effect of the regenerative mode is increased by good efficiency, various components of the system are designed with case for high efficiency.

Pulsed forces applied to the pedals may not be used directly for assistance, but may be smoothed to avoid a pulsed current, and the tire air pressure and the lubrication of the running transmission system may be detected by suitable means and indicated to the rider by suitable means for prompting servicing of the bicycle. It is important to construct the system in view of these considerations.

According to the present invention, it is generally possible to:

1. greatly increase the distance that the bicycle can travel while being power-assisted;
2. allow the battery capacity to be reduced if the distance that the bicycle can travel may be short;
3. reduce the cost and weight of the bicycle with the power assisting function;
4. lead to the possibility of new sports such as a long-distance power-assisted bicycle race; and
5. increase the range in which the bicycle can operate, partly covering an area of motorcycles for environmental improvement.

The present invention has been described as being applied to a bicycle with a power assisting function. However, the principles of the invention are applicable to wheelchairs and manually powered small-size vehicles.

Although certain preferred embodiments of the present invention have been shown and described in detail, it should be understood that various changes and modifications may be made therein without departing from the scope of the appended claims.

What is claimed is:

1. A bicycle with a power assisting function, comprising:
   an electric motor for adding part of propulsive forces to manual forces to assist in the manual forces;
   power supply means including a battery for supplying electric energy to said electric motor;
   regenerating means for regenerating electric energy to charge said power supply means with part of energy from extra manual forces;
   control means for controlling operation of said electric motor, wherein said control means further comprises means for controlling operation of said regeneration means;
   running state detecting means for detecting a running state, wherein said running state detecting means further comprises a gradient detecting means for detecting a gradient of a running path for the bicycle; and a speed detecting means for detecting a present speed of the bicycle;
   display/indication means for displaying/indicating a running state and/or a running target depending on the running state detected by said running state detecting means, wherein said display/indication means further comprises means for displaying/indicating a target speed and a present running speed detected by said speed detecting means and/or a quantity depending on an excess or insufficiency of the difference between said target speed and said present running speed depending on the gradient detected by said gradient detecting means.

2. A bicycle according to claim 1, wherein said display/indication means comprises means for displaying/indicating, as said target speed, a running speed to maximize a charging current supplied to said power supply means if the gradient detected by said gradient detecting means is a downhill gradient, and a speed, determined in view of a practical running speed, to minimize a consumed current of said power supply means if the gradient detected by said gradient detecting means is an uphill gradient.

3. A bicycle according to claim 1, wherein said control means comprises means for controlling operation of said regenerating means if the gradient detected by said gradient detecting means is a downhill gradient and controlling running of the bicycle at an optimum running speed depending on the detected downhill gradient.

4. A bicycle with a power assisting function, comprising:
   an electric motor for adding part of propulsive forces to manual forces to assist in the manual forces;
   power supply means including a battery for supplying electric energy to said electric motor;
   regenerating means for regenerating electric energy to charge said power supply means with part of energy from extra manual forces;
   control means for controlling operation of said electric motor, wherein said control means further comprises means for controlling operation of said regeneration means to regenerate electric energy when a running speed of the bicycle is higher than a predetermined level while the bicycle is running on flat terrain;
   running state detecting means for detecting a running state, and display/indication means for displaying/indicating a running state and/or a running target depending on the running state detected by said running state detecting means.

5. A bicycle according to claim 4, wherein said regenerating means comprises means for utilizing part of the electric energy to charge said power supply means when a brake lever is operated.

6. A bicycle according to claim 4, wherein said electric motor comprises a direct-drive electric motor having a rotatable shaft and a stator which are directly coupled to a front wheel, and an outer rotor rotatable in unison with the front wheel, said direct-drive electric motor serving as said regenerating means.

7. A bicycle according to claim 4, wherein said running target comprises propulsive forces to be generated manually, said display/indication means comprising means for displaying/indicating any difference between said running target and a present running state for the rider of the bicycle to determine the difference exactly.

8. A bicycle with a power assisting function, comprising:
   an electric motor for adding part of propulsive forces to manual forces to assist in the manual forces;
   power supply means for supplying electric energy to said electric motor;
   manual force detecting means for detecting manual forces as propulsive forces; and
   control means for controlling operation of said electric motor depending on the magnitude of the manual forces detected by said manual force detecting means; said electric motor comprising a direct-drive electric motor having a rotatable shaft and a stator which are directly coupled to a front wheel, and an outer rotor rotatable in unison with the front wheel, said direct-drive electric motor being operable as an electric generator with extra manual forces for utilizing part of regenerated electric energy to charge said power supply means.

* * * * *